United States Patent
Van Eijndhoven et al.

(10) Patent No.: US 7,356,670 B2
(45) Date of Patent: Apr. 8, 2008

(54) DATA PROCESSING SYSTEM (75) Inventors: Josephus Theodorus Johannes Van Eijndhoven, Eindhoven (NL); Evert J. Pol, Eindhoven (NL); Martijn Johan Rutten, Eindhoven (NL)

(73) Assignee: NXP B.V., Eindhoven (NL)

(*) Notice: Subject to any disclaimer, the term of this patent is extended or adjusted under 35 U.S.C. 154(b) by 162 days.

(21) Appl. No.: 10/498,293

(22) PCT Filed: Dec. 5, 2002

(86) PCT No.: PCT/IB02/05173

§ 371 (c)(1),
(2), (4) Date: Feb. 9, 2005

(87) PCT Pub. No.: WO03/052587

PCT Pub. Date: Jun. 26, 2003

(65) Prior Publication Data

US 2005/0183091 A1   Aug. 18, 2005

(30) Foreign Application Priority Data

Dec. 14, 2001  (EP) .................................. 01204886

(51) Int. Cl.
G06F 12/08 (2006.01)
G06F 9/22 (2006.01)

(52) U.S. Cl. .................. 712/34; 712/43; 712/225; 712/229; 711/147

(58) Field of Classification Search .................... 712/1, 712/32, 34, 43, 225, 229; 711/147
See application file for complete search history.

(56) References Cited

U.S. PATENT DOCUMENTS

| 5,113,522 A | * | 5/1992  | Dinwiddie et al. | 713/375 |
| 5,561,784 A | * | 10/1996 | Chen et al.      | 711/157 |
| 5,805,915 A | * | 9/1998  | Wilkinson et al. | 712/20  |
| 5,832,262 A | * | 11/1998 | Johnson et al.   | 718/102 |

* cited by examiner

Primary Examiner—Tonia L. M. Dollinger
(74) Attorney, Agent, or Firm—Peter Zawilski (57) ABSTRACT A multiprocessor data processing system is described wherein the processors communicate to each other via a shared memory. Each of the processors comprises an administration unit (18a) and a computational unit. The administration unit of a writing processor maintains information defining a section in the memory which is free for storing data objects for readout by the reading processor. The administration unit of the reading processor maintains information defining a section in the memory in which the writing processor has written completed data for the data objects. The processors are arranged to signal a message to another processor via a processor synchronization channel for updating the information in the administration unit of said other processor.

11 Claims, 8 Drawing Sheets

FIG.1

FIG. 2 a: Initial situation of 'data tape' with current access point:

b: Getspace provides window on requested space:

c: Read/Write actions on contents:

d: Putspace moves access point ahead:

DATA PROCESSING SYSTEM

The invention relates to a data processing system having multiple processors.

A heterogeneous multiprocessor architecture for high performance, data-dependent media processing e.g. for high-definition MPEG decoding is known. Media processing applications can be specified as a set of concurrently executing tasks that exchange information solely by unidirectional streams of data. G. Kahn introduced a formal model of such applications already in 1974, 'The Semantics of a Simple Language for Parallel Programming', Proc. of the IFIP congress 74, August 5-10, Stockholm, Sweden, North-Holland publ. Co, 1974, pp. 471-475 followed by an operational description by Kahn and MacQueen in 1977, 'Co-routines and Networks of Parallel Programming', Information Processing 77, B. Gilchhirst (Ed.), North-Holland publ., 1977, pp 993-998. This formal model is now commonly referred to as a Kahn Process Network.

An application is known as a set of concurrently executable tasks. Information can only be exchanged between tasks by unidirectional streams of data. Tasks should communicate only deterministically by means of a read and write process regarding predefined data streams. The data streams are buffered on the basis of a FIFO behaviour. Due to the buffering two tasks communicating through a stream do not have to synchronise on individual read or write processes In stream processing, successive operations on a stream of data are performed by different processors. For example a first stream might consist of pixel values of an image, that are processed by a first processor to produce a second stream of blocks of DCT (Discrete Cosine Transformation) coefficients of 8×8 blocks of pixels. A second processor might process the blocks of DCT coefficients to produce a stream of blocks of selected and compressed coefficients for each block of DCT coefficients.

Figure 1:
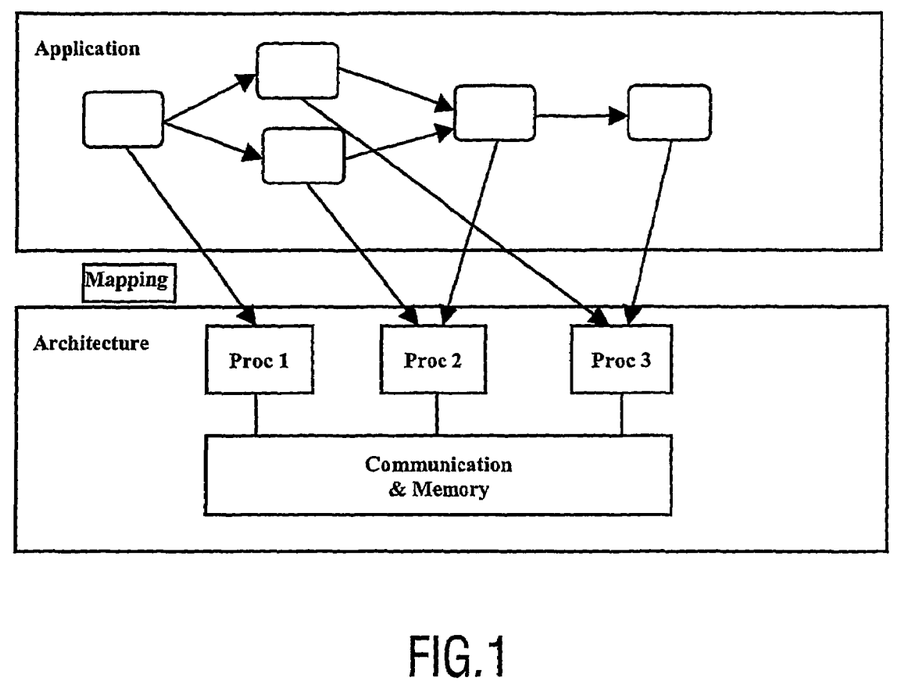
FIG. 1 an illustration of the mapping of an application to a processor according to the prior art.

FIG. 1 shows a illustration of the mapping of an application to a processor as known from the prior art. In order to realise data stream processing a number of processors are provided, each capable of performing a particular operation repeatedly, each time using data from a next data object from a stream of data objects and/or producing a next data object in such a stream. The streams pass from one processor to another, so that the stream produced by a first processor can be processed by a second processor and so on. One mechanism of passing data from a first to a second processor is by writing the data blocks produced by the first processor into the memory.

The data streams in the network are buffered. Each buffer is realised as a FIFO, with precisely one writer and one or more readers. Due to this buffering, the writer and readers do not need to mutually synchronize individual read and write actions on the channel. Reading from a channel with insufficient data available causes the reading task to stall. The coprocessors can be dedicated hardware function units which are only weakly programmable. All coprocessors run in parallel and execute their own thread of control. Together they execute a Kahn-style application, where each task is mapped to a single coprocessor. The coprocessors allow multi-tasking, i.e., multiple Kahn tasks can be mapped onto a single coprocessor.

It is therefore an object of the invention to improve the operation of a Kahn-style data processing system.

This object is solved by a data processing system according to claim 1. In the dataprocessing according to the invention a distributed administration is maintained about the use of the memory through which the processors communicate the data stream to each other. On the one hand the administration unit of the writing processor maintains information defining a section in the memory which is free for storing data objects for readout by the other processor. On the other hand the administration unit of the second processor maintains information defining a section in the memory in which the first processor has written completed data for the data objects. This has the advantage that the writing processor does not need to check with the second processor for each data object which it writes whether it would overwrite an older data object which is still needed by the reading processor. Likewise, the reading processor does not need to check with the writing processor for each data object whether it is already valid. Instead each of the processors checks with its administration unit, whether a memory access is allowed or not. This only requires a local communication. It is true that in order to maintain the information in the administration unit a global communication is necessary, but this can take place for a group of data objects at a time.

The update messages to the administration units could take place in either push mode as defined in claim 2 or in pull mode described in claim 3. In the pull mode the reading processor requests how many data objects have been written by the writing processor. The writing processor responds thereto by a message indicating the number of written data objects. Likewise the writing processor requests how many data objects have been read upon which the reading processor responds with a message indicating this number. Hence, two messages are required for updating the information in an administration unit.

In the push mode described in claim 2 the writing processor sends a message to the administration unit of the reading processor that a number of data objects have become available. Likewise, the reading processor sends a message to the writing processor that a number of data objects has been read, the memory space occupied by said data objects being released for writing new data objects. Hence, the push mode has the advantage that only one message is required for updating the information in an administration unit.

In an embodiment a processor in a data processing system according to the invention may verify for each individual access whether it is in its own section, i.e. allowed or not. For example the reading processor may verify for each data object which it wants to read whether it is in its own section. A more preferred embodiment is however described in claim 4. In this embodiment the processor has the ability to do a verification for a group of data objects at one time. In this way it can be assured that once a task is started it will not be interrupted anymore until a complete block of data has been processed. This is in particular advantageous for operations where a complete block of data has to be processed at one time, such as a digital cosine transform. In this way it is prevented that a large amount of state information has to be saved during interruption of the task.

The embodiment of claim 5 has the advantage that when the second processor has insufficient data objects to continue with a particular task, its processing capacity may be used for carrying out an other task.

In the embodiment of claim 6 the second processors is a function-specific dedicated coprocessor for performing a range of stream processing tasks, such as variable length decoding, runlength decoding, motion compensation, image scaling, or performing a DCT transformation.

It is not necessary that the processors sequentially access the assigned section of the memory. Preferably, the processors are arranged to perform read and/or write operations enabling to randomly access locations within the section in said memory defined by its administration unit as claimed in claim 7.

These and other aspects of the invention are described in more detail with reference to the drawings, the figures showing.

Figure 2:
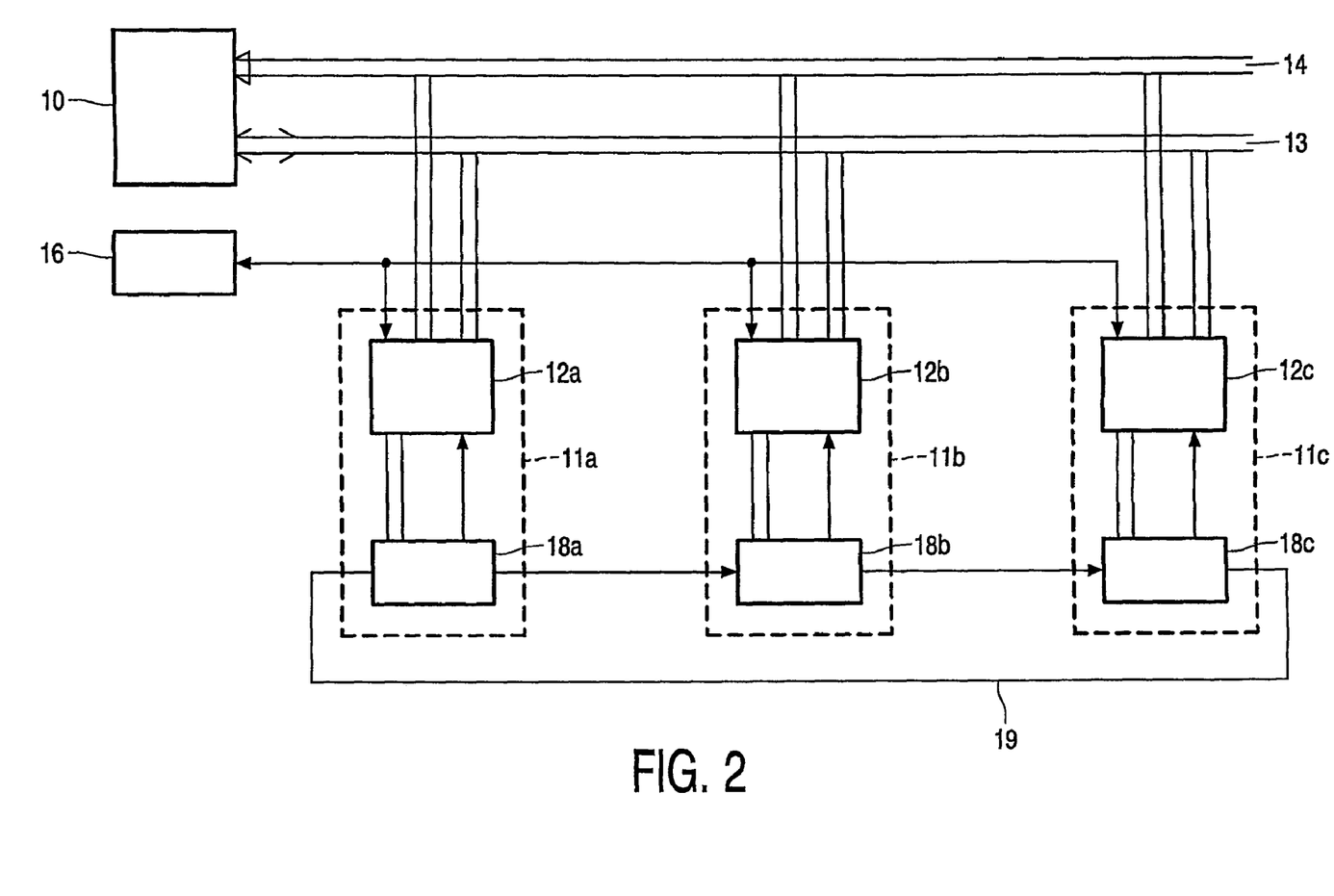
FIG. 2 a schematic block diagram of an architecture of a stream based processing system.

FIG. 2 shows a processing system according to the invention. The system contains a memory 10, a number of processors 11a, 11b, 11c and an arbiter 16. The processors 11a-c each comprise a computational unit 12a, 12b, 12c and an administration unit 18a, 18b, 18c. Three processors 11a, 11b, 11c are shown by way of example, but in practice any number of processors may be used. The processors 11a-c are connected to the memory 10 via an address bus 14 and a data bus 13. The processors 11a-c are connected to the arbiter 16 and they are connected to each other via a synchronization channel comprising the administration units 18a-c which are coupled to each other via a communication network 19, such as a token ring.

Preferably, the processors 11a-c are dedicated processors, each specialized to perform a limited range of stream processing tasks efficiently. That is, each processor is arranged to apply the same processing operation repeatedly to successive data objects received via data bus 13. The processors 11a-c may each perform a different task or function, such as variable length decoding, runlength decoding, motion compensation, image scaling or performing a DCT transformation. Also programmable processors may be included, such as a TriMedia, or a MIPS-processor.

In operation each processor 11a-c executes operations on one or more data streams. Operations may involve for example receiving a stream and generating another stream, or receiving a stream without generating a new stream, or generating a stream without receiving a stream, or modifying a received stream. Processors 11a-c are able to process data streams generated by other ones of the processors 11a-c, or even streams that they have generated themselves. A stream comprises a succession of data objects which are transferred from and to the processors 11a-c via memory 10.

In order to read or write data from a data object, the processor 11a-c accesses a part of memory 10 that is allocated to the stream.

Figure 3:
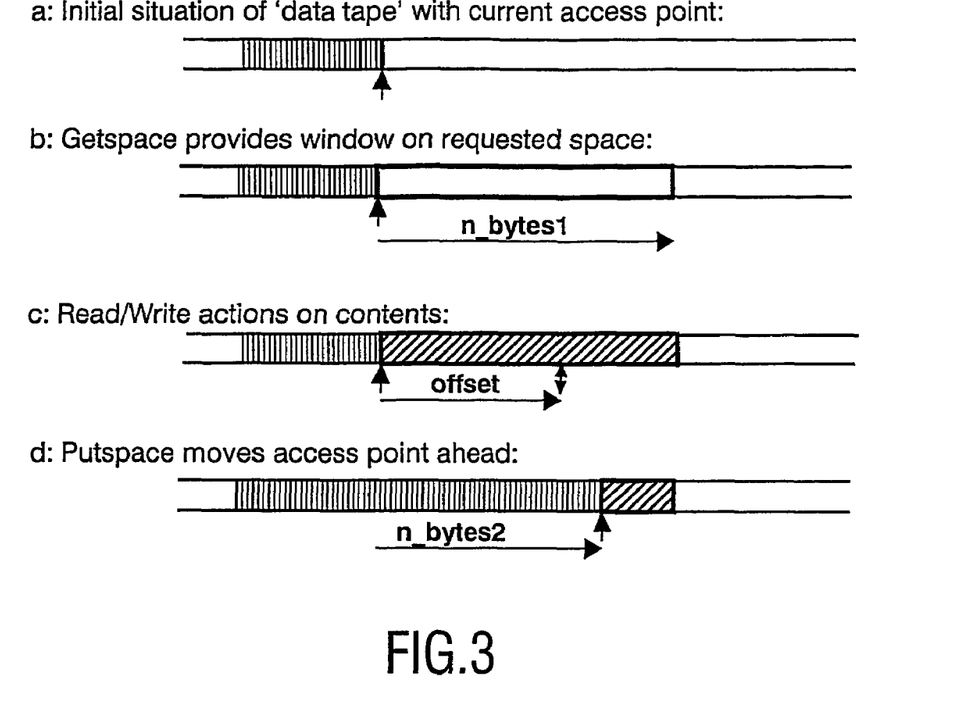
FIG. 3 an illustration of the synchronising operation and an I/O operation in the system of FIG. 2.

FIG. 3 depicts an illustration of the process of reading and writing and its associated synchronisation operations. From the coprocessor point of view, a data stream looks like an infinite tape of data having a current point of access. The getspace call issued from the coprocessor (computational unit) asks permission for access to a certain data space ahead of the current point of access as depicted by the small arrow in FIG. 3a. If this permission is granted, the coprocessor can perform read and write actions inside the requested space, i.e. the framed window in FIG. 3b, using variable-length data as indicated by the n_bytes argument, and at random access positions as indicated by the offset argument.

If the permission is not granted, the call returns false. After one or more getspace calls—and optionally several read/write actions—the coprocessor can decide if is finished with processing or some part of the data space and issue a putspace call. This call advances the point-of-access a certain number of bytes, i.e. n_bytes2 in FIG. 3d, ahead, wherein the size is constrained by the previously granted space.

Figure 4:
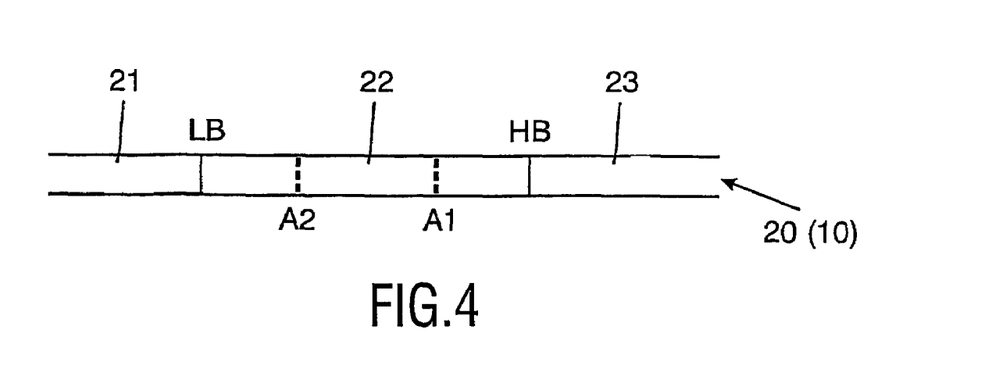
FIG. 4 a schematic diagram of a shared memory
Figure 5:
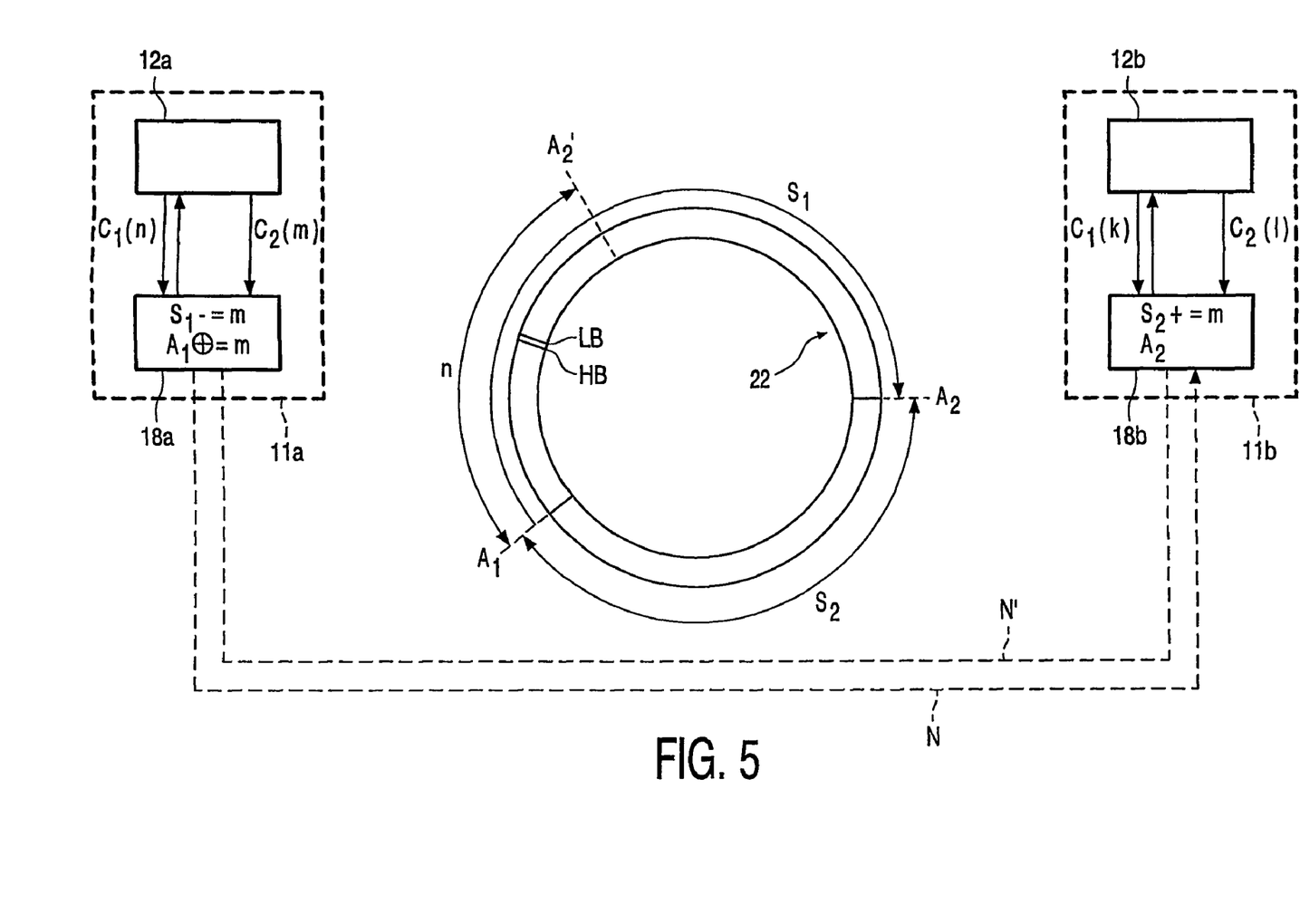
FIG. 5 a mechanism of updating local space values in each administration unit according to FIG. 2 using the memory of FIG. 4.

FIG. 4 shows a logical memory space 20 of the memory 10 that contains a series of memory locations that have logically successive addresses. FIG. 5 shows how two processors 11a and 11b exchange data objects via the memory 10. The memory space 20 contains subspaces 21, 22, 23 allocated to different streams. By way of example the subspace 22, which is bounded by the low boundary address LB and the high boundary address HB is shown in more detail in FIG. 4. In this subspace 22 the memory locations between the adresses A2 and A1, also indicated by section A2-A1 contain valid data, available for a reading processor 11b. The memory locations between the address A1 and the high boundary HB of the subspace, as well as those between the low boundary of the subspace LB and the address A2, indicated by section A1-A2 are available to the writing processor 11a for writing new data. Byway of example it is assumed that processor 11b accesses data objects stored in the memory locations allocated to a stream generated by the processor 11a.

In the example described above the data for a stream is written in a cyclical series of memory locations, starting at the logically lowest address LB each time a logically highest address HB has been reached. This is illustrated by the circular representation of the memory subspace in FIG. 5 wherein the lower boundary LB and the higher boundary HB are neighbouring each other.

Administration unit 18b ensures that the processor 11b does not access memory locations 22 before valid data for a processed stream has been written to these memory locations. Similarly, administration unit 18a is used here to ensure that the processor 11a does not overwrite useful data in memory 10. In the embodiment shown in FIG. 2, administration units 18a,b form part of a ring 18a,b,c, in which synchronization signals are passed from one processor 11a-c to the next, or blocked and overwritten when these signals are not needed at any subsequent processor 11a-c. The administration units 18a, 18b, 18c together form a synchronization channel. The administration units 18a maintain information about the memory space which is used for transferring the stream of data objects from processor 11a to processor 11b. In the embodiment shown administration unit 18a stores a value A1 which is representative for the start A1 of the address range of the section A1-A2 available to be written by processor 11a. It also stores a value S1 which is representative for the size of that section. However the said address range might also be indicated by their boundaries, or by the upper boundary A2 and the value S1. Likewise, administration unit 18b stores a value A2 which is representative for the start A2 of the section A2-A1 which contains valid data for processor 11b. It also stores a value S2 which is representative for the size of that section. When processor 11a starts generating data for processor 11b, the size S2 of the section A2-A1 should be initialized at zero, as no valid data is available yet for the latter processor 11b. Before the processor 11a starts writing data into the memory subspace 22 it requests a section within this space by a first instruction C1 (getspace). A parameter of this instruction is the size n which is claimed. If a plurality of memory subspaces are available, it also includes a parameter for identifying the subspace. The subspace may be identified by an identification of the stream which is transferred via this subspace. As long as the claimed size n is less than or equal to the size S1 stored by administration unit 18a for the section, the latter 18a grants this request. The processor 11a can now write data objects to the portion A1-A2' with size n of the section A1-A2 of the memory subspace to which it requested access.

If the required number n reaches beyond the indicated number S1, the generating processor 11a suspends processing of the indicated stream. The generating processor 11a may then take up processing for another stream that it is generating, or the generating processor 11a may pause processing altogether. If the required number reaches beyond the indicated number, the generating processor 11a will execute the instruction that indicates the required number of memory locations with new data again at a later time, until the generating processor 11a detects the event that the required number does not reach beyond the location indicated by the receiving processor 11a. After the detection of this event the generating processor 11a continues processing.

In order to synchronize, a generating processor 11a-c that generates a data stream sends an indication of the number of locations in memory 10 of which the data stream content has become valid, after this data stream content has become valid. In the present example, if the processor 11a has written data objects occupying a space m, it gives a second instruction C2 (putspace) indicating that said data objects are available to further processing by the second processor 11b. A parameter m of this instruction indicates the corresponding size of the section within memory subspace 22 which is released. A further parameter may be included to indicate the memory subspace. Upon receipt of this instruction the administration unit 18a reduces the available size S1 with m and increases the address A1:

A1=A1⊕m, wherein ⊕ is summation modulo HB-LB.

The administration unit 18a further sends a message M to the administration unit 18b of processor 11b. Upon receipt of this message the administration unit 18b increases the size S2 of A2-A1 with m. When the receiving processor, here 11b reaches a stage of processing of the stream where new data is needed, it sends an instruction C1(k) that indicates the required number of memory locations k with new data. After the instruction the computational unit 12b of the receiving processor 11b continues processing if the response from the administration unit 18b indicates that this required number does not reach beyond the location indicated by the generating processor 11a.

If the required number k reaches beyond the indicated number S2, the receiving processor 11b suspends processing of the indicated stream. The receiving processor 11b may then take up processing of another stream that it is processing, or the receiving processor may pause processing altogether. If the required number k reaches beyond the indicated number S2, the receiving processor 11b will execute the instruction that indicates the required number of memory locations with new data again at a later time, until the event has been recorded in the receiving processor 11b that the required number k does not reach beyond the location A1 indicated by the generating processor 11a. Upon recording this event the receiving processor 11b resumes processing the stream.

In the example described above the data for a stream is written in a cyclical series of memory locations, starting at the logically lowest address LB each time a logically highest address HB has been reached. This creates the possibility that the generating processor 11a catches up with the receiving processor and overwrites data that is still needed by the receiving processor. When it is desired to prevent that the generating processor 11a-c overwrites such data, the receiving processor 11a-c sends an indication of the number of memory locations in memory that it no longer needs each time after the receiving processor 11a-c has stopped processing content from these locations. This can be realized by means of the same instruction C2 (putdata) which is used by the generating processor 11a. This instruction includes the number of memory locations m' which it no longer needs. In addition it may contain an identification of the stream, and or the memory subspace if more than one stream is processed. Upon receipt of this instruction the administration unit 18b decreases the size S2 with m', and increases the address A2 with m' modulo the size of the memory subspace. The administration unit 18b also sends a message M' to the administration unit 18a of the generating processor 11a. Upon receipt of this message the administration unit 18a of the generating processor 11a increases the size S1.

This means that data from a stream can be overwritten up to a current initial location 24a-c, indicated in FIG. 4 for a number of different streams. The indication is recorded in the generating processor 11a-c. When the generating processor 11a-c reaches a stage of processing where it needs to write data from the generated stream to a number of new locations in memory, the generating processor 11a-c executes a instruction that indicates the required number of memory locations needed for new data. After the instruction the generating processor 11a-c continues processing if the indication recorded by the generating processor 11a-c indicates that this required number does not reach beyond the location indicated by the receiving processor 11a-c.

Preferably, the number of locations with valid content and the number of locations that may be overwritten are indicated in terms of a number of standard locations, and not in terms of a number of data objects in the stream. This has the effect that the processors that generate and receive the data stream don't have to indicate validity or reusability of locations with the same block size. The advantage is that the generating and receiving processor 11a-c can each be designed without knowledge of the block size of the other processor 11a-c. A processor 11a-c that operates at a small block size need not wait for a processor that operates at a large block size.

The indication of the memory locations may be performed in several ways. One way is to indicate the number of additional memory locations that is valid or that may be overwritten. Another solution is to transmit the address of the last valid or overwriteable location.

Preferably, at least one of the processors 11a-c is capable of alternately operating on different streams. For each received stream the processor 11a-c locally keeps information about the location in memory up to which the data is valid and for each generated stream it keeps information about the location in memory up to which new data may be written.

The implementation and operation of the administration units 18a,b,c do not need to make differentiations between read versus write ports, although particular instantiations may make these differentiations. The operations implemented by the administration units 18a,b,c effectively hide implementation aspects such as the size of the FIFO buffer 22, its location in memory 20, any wrap-around mechanism on address for memory bound cyclic FIFO's, caching strategies, cache coherency, global I/O alignment restrictions, data bus width, memory alignment restrictions, communication network structure and memory organisation.

Preferably, the administration units 18a-c operate on unformatted sequences of bytes. There is no need for any correlation between the synchronisation packet sizes used by the writer 11a and a reader 11b which communicate the stream of data. A semantic interpretation of the data contents is left to the coprocessor, i.e. the computation unit 12a, 12b. The task is not aware of the application graph incidence structure, like which other tasks it is communicating to and on which coprocessors these tasks mapped, or which other tasks are mapped on the same coprocessor.

In high-performance implementations of the administration units 18a-c the read call, write call, getspace call, putspace calls can be issued in parallel via a read/write unit and a synchronisation unit comprised in the administration units 18a-c. Calls acting on the different ports of the administration unit 18a-c do not have any mutual ordering constraint, while calls acting on identical ports of the administration unit 18a-c must be ordered according to the caller task or coprocessor. For such cases, the next call from the coprocessor can be launched when the previous call has returned, in the software implementation by returning from the function call and in hardware implementation by providing an acknowledgement signal.

A zero value of the size argument, i.e. n_bytes, in the read call can be reserved for performing pre-fetching of data from the memory to the cache of the administration unit at the location indicated by the port_ID- and offset-argument. Such an operation can be used for automatic pre-fetching performed by the administration unit. Likewise, a zero value in the write call can be reserved for a cache flush request although automatic cache flushing is a responsibility of the administration unit.

Optionally, all five operations accept an additional last task_ID argument. This is normally the small positive number obtained as result value from an earlier gettask call. With a gettask call the coprocessor (computation unit) can request its administration unit to assign a new task, for example if the computation unit can not proceed with the current task, because insufficient data objects are available. Upon this gettask call the administration unit returns the identification of the new task. The zero value for this argument in the operations read, write, putspace and getspace is reserved for calls which are not task specific but relate to coprocessor control.

In the preferred embodiment the set-up for communicating a data stream is a stream with one writer and one reader connected to the finite-size of FIFO buffer. Such a stream requires a FIFO buffer which has a finite and constant size. It will be pre-allocated in memory and in its linear address range a cyclic addressing mechanism is applied for proper FIFO behaviour.

Figure 6:
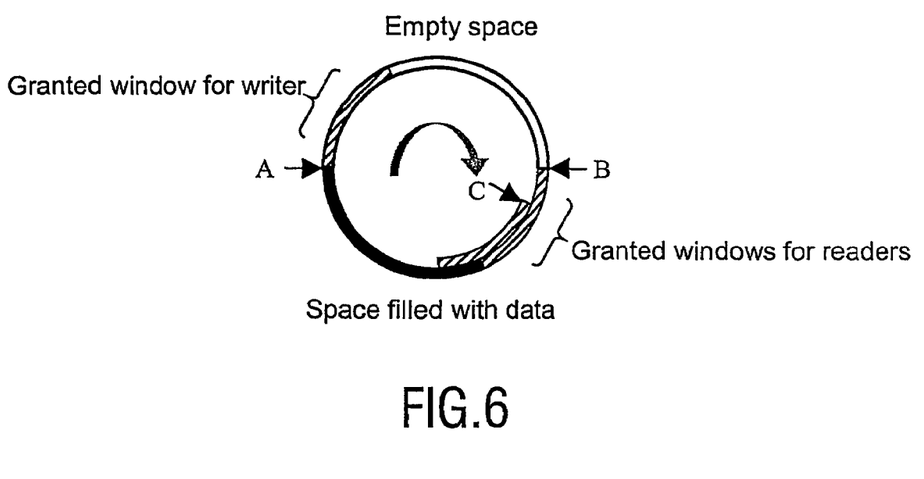
FIG. 6 an illustration of the FIFO buffer with a single writer and multiple readers.

However in a further embodiment based on FIG. 2 and FIG. 6, the data stream produced by one task is to be consumed by two or more different consumers having different input ports. Such a situation can be described by the term forking. However, we want to re-use the task implementations both for multi-tasking hardware coprocessors as well as for software task running on the CPU. This is implemented through tasks having a fixed number of ports, corresponding to their basic functionality. Any needs for forking induced by application configuration are to be resolved by the administration unit.

Clearly stream forking can be implemented by the administration units 18a-c by just maintaining two separate normal stream buffers, by doubling all write and putspace operations and by performing an AND-operation on the result values of doubled getspace checks. Preferably, this is not implemented as the costs would include a double write bandwidth and probably more buffer space. Instead preferably, the implementation is made with two or more readers and one writer sharing the same FIFO buffer.

FIG. 6 shows an illustration of the FIFO buffer with a single writer and multiple readers. The synchronisation mechanism must ensure a normal pair wise ordering between A and B next to a pair wise ordering between A and C, while B and C have no mutual constraints, e.g. assuming they are pure readers. This is accomplished in the administration unit associated to the coprocessor performing the writing operation by keeping track of available space separately for each reader (A to B and A to C). When the writer performs a local getspace call its n_bytes argument is compared with each of these space values. This is implemented by using extra lines in said stream table for forking connected by one extra field or column to indicate changing to a next line.

This provides a very little overhead for the majority of cases where forking is not used and at the same time does not limit forking to two-way only. Preferably, forking is only implemented by the writer. The readers need not be aware of this situation.

Figure 7:
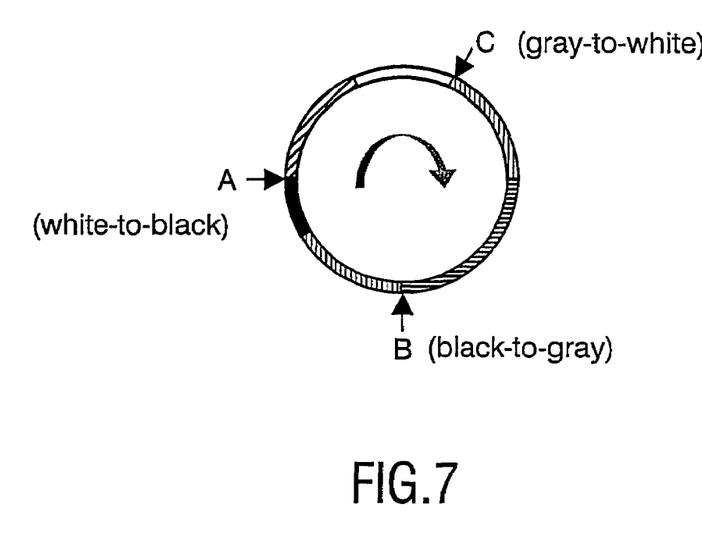
FIG. 7 a finite memory buffer implementation for a three-station stream.

In a further embodiment based on FIG. 2 and FIG. 7, the data stream is realised as a three station stream according to the tape-model. Each station performs some updates of the data stream which passers by. An example of the application of the three station stream is one writer, and intermediate watchdog and the final reader. In such example the second task preferably watches the data that passes and may be inspects some while mostly allowing the data to pass without modification. Relatively infrequently it could decide to change a few items in the stream. This can be achieved efficiently by in-place buffer updates by a processor to avoid copying the entire stream contents from one buffer to another. In practice this might be useful when hardware coprocessors communicate and a main CPU intervenes to modify the stream to correct hardware flaws, to do adaptation towards slightly different stream formats, or just for debugging reasons. Such a set-up could be achieved with all three processors sharing the single stream buffer in memory, to reduce memory traffic and processor workload. The task B will not actually read or write the full data stream.

FIG. 7 depicts a finite memory buffer implementation for a three-station stream. The proper semantics of this three-way buffer include maintaining a strict ordering of A, B and C with respect to each other and ensuring no overlapping windows. In this way the three-way buffer is a extension from the two-way buffer shown in FIGS. 4 and 5. Such a multi-way cyclic FIFO is directly supported by the operations of the administration units as described above as well as by the distributed implementation style with putspace messages as discussed in the preferred embodiment. There is no limitation to just three stations in a single FIFO. In-place processing where one station both consumes and produces useful data is also applicable with only two stations. In this case both tasks performing in-place processing to exchange data with each other and no empty space is left in the buffer.

In the further embodiment based on FIG. 2 the single access to buffer is described. Such a single access buffer comprises only a single port. In this example no data exchange between tasks or processors will be performed. Instead, it is merely an application of the standard communication operations of said administration units for local use. The set-up of the administration units consists of the standard buffer memory having a single access point attached to it. The task can now use the buffer as a local scratchpad or cache. From the architectural point of view this can have advantages such as the combined uses of larger memory for several purposes and tasks and for example the use of the software configurable memory size. Besides the use as scratchpad memory to serve the task specific algorithm of this set-up is well applicable for storing and retrieving tasks states in the multi-tasking coprocessor. In this case performing read/write operations for state swapping is not part of the task functional code itself but part of the coprocessor control code. As the buffer is not used to communicate with other tasks it is normally no need to perform the put space and getspace operations on this buffer.

Figure 8:
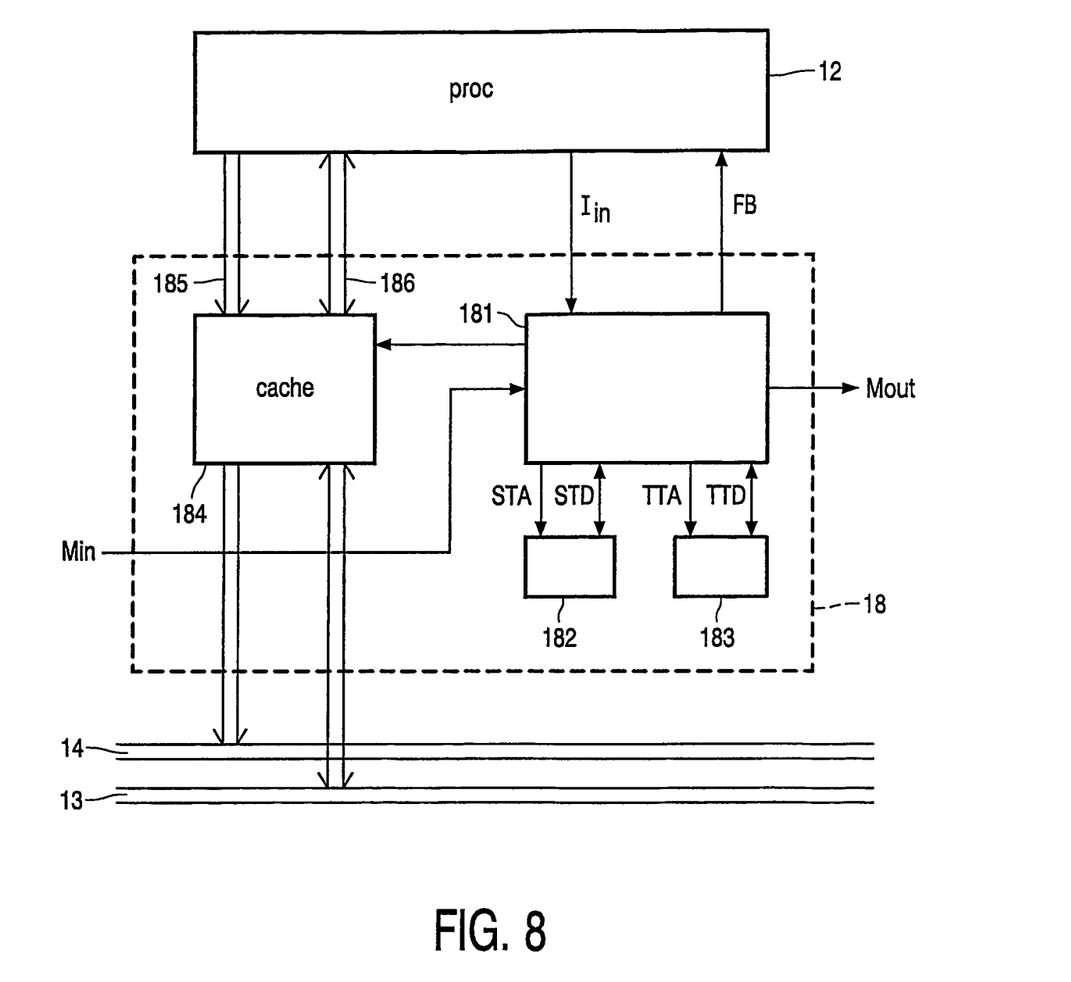
FIG. 8 a processor forming part of the processing system in more detail.

In a further embodiment based on FIG. 2 and FIG. 8, the administration units 18a-c according to the preferred embodiment further comprise a data cache for data transport, i.e. read operation and write operations, between the coprocessors 12 and the memory 20. The implementation of a data cache in the administration units 18a-c provide a transparent translation of data bus widths, a resolvement of alignment restrictions on the global interconnect, i.e. the data bus 13, and a reduction of the number of I/O operations on the global interconnect.

Preferably, the administration units 18a-c comprise separate read write interfaces each having a cache, however these caches are invisible from the application functionality point of view. Here, the mechanism of the putspace and getspace operations is used to explicitly control cache coherence. The caches play an important role in decoupling the coprocessor reads and write ports from the global interconnect of the communication network (data bus) 13. These caches have a major influence on the system performance regarding speed, power and area.

The access in a window of stream data which is granted to a task port is guaranteed to be private. As a result read and write operations in this area are save and at first side do not need intermediate intra-processor communication. The access window is extended by means of local getspace requests obtaining new memory space from a predecessor in the cyclic FIFO. If some part of the cache is tagged to correspond to such an extension and the task may be interested in reading the data in that extension then such part of the cache needs invalidation. If then later a read operation occurs on this location a cache miss occurs and fresh valid data is loaded into the cache. An elaborate implementation of the administration unit could use the getspace to issue the pre-fetch request to reduce cache miss penalty. The access window is shrunk by means of local putspace request leaving new memory space to a successor in the cyclic FIFO. If some part of such a shrink happens to be in the cache and that part has been written, then such part of the cache needs to be flushed to make the local data available to other processors. Sending the putspace message out to another coprocessor must be postponed until the cache flush is completed and safe ordering of memory operations can be guaranteed.

Using only local getspace and putspace events for explicit cache coherency control is relatively easy to implement in large system architectures in comparison with other generic cache coherency mechanisms such as a bus snooping. Also it does not provide the communication overhead like for instance a cache write-through architecture.

The getspace and putspace operations are defined to operate at byte granularity. A major responsibility of the cache is to hide the global interconnect data transfer size and the data transfer alignment restrictions for the coprocessor. Preferably, the data transfer size is set to 16 bytes on ditto alignment, whereas synchronised data quantities as small as 2 bytes may be actively used. Therefore, the same memory word or transferred unit can be stored simultaneously in the caches of different coprocessors and invalidate information is handled in each cache at byte granularity.

FIG. 8 shows a combination of processor 12 and a administration unit 18 for use in a processing system as shown in FIG. 2. The administration unit 18 shown in more detail comprises a controller 181, a first table (stream table) 182 comprising stream information and a second table (task table) 183 comprising task information. The administration unit 18 also comprises a cache 184 for the processor 12. The presence of the cache 184 in the synchronization interface 18 allows for a simple design of the cache and simplifies cache control. In addition one or more caches, such as an instruction cache may be present in the processor 12.

The controller 181 is coupled via an instructionbus Iin to the corresponding processor, i.e. 12a, for receiving instructions of the type C1, C2. A feedback line FB serves to give feedback to said processor, for example to grant a request for bufferspace. The controller has a message input line Min to receive a message from a preceeding administration unit in the ring. It also has a message output line Mout to pass a message to a succeeding administration unit. An example of a message which a administration unit may pass to its successor is that a portion of buffer memory is released. The controller 181 has address buses STA and TTA to select an address of the stream table 182 and of the task table 183 respectively. It further has data buses STD and TTD to read/write data to from these tables respectively.

The administration unit 18 transmits and receives synchronization information from the other processors (not shown in FIG. 3) and stores at least the received information. The administration unit 18 further comprises a cache memory 184 that serves to store a copy of the data from the data stream locally in the processor 12. The cache memory 184 is coupled via a local address bus 185 and a local data bus 186 to the processor 12. In principle, processor 12 may address cache memory 184 with addresses that refer to locations in the memory 10 of the processing system of FIG. 1. If cache memory 184 contains a valid copy of the content of the addressed data, the processor 12 accesses the location in cache memory 184 that contains the copy and memory 10 (FIG. 1) is not accessed. The processor 12 preferably is a specialized processor core designed to perform one type of operation, e.g. MPEG decoding, very efficiently. Processor cores in different processors in the system may have different specializations. The synchronization interface 18 and its cache memory 184 may be identical for all different processors, with just the cache memory size possibly being adapted to the needs of the processor 12.

Preferably, administration unit 18 is used to manage prefetching into cache memory 184 from memory 10 and/or write-back from that cache memory 184 to memory 10. When the administration unit 18 receives a signal that the memory 10 contains valid data up to a certain memory location, then preferably the controller 181 of the administration unit 18 signals cache memory 184 to prefetch data from memory 10 up to that location. The controller 181 of the administration unit 18 detects when the data has been prefetched. If the processor 12 requests to access new data, administration unit 18 will permit processor 12 to read data from new locations only if the administration unit 18 has received a signal that the locations are available and after cache memory 184 has prefetched data for those locations. Similarly, when processor 12 signals to administration unit 18 that it has completed writing to locations up to a point in the memory, administration unit 18 causes cache memory 184 to write back the data to memory 10 up to the signaled point. Administration unit 18 detects when write back is complete and transmits the information about the number of locations that have been completed via the synchronization message network only when write back is complete.

Thus, the predictability of access to memory for a stream of data objects is used to improve cache management.

Similarly administration unit 18 may respond to a signal from the processor core 12, that the processor 12 has finished reading the stream up to a location in memory, by marking the cache locations used for memory locations up to that location as first available for cache replacement. When the processor 12 signals to the administration unit 18 that it intends to write data for a stream up to a location in memory, the administration unit 18 may respond by assigning cache memory locations that map to the memory location involved.

In the embodiment shown the synchronization message network between the sysnchronization interfaces is a token ring network. This has the advantage that it can be complied with a relatively small number of connections. Furthermore, the structure of token ring itself is scalable, so that a node can be added or deleted with little effect on interface design. However, in other embodiments the communication network may be implemented in different ways, e.g. as bus based network, or a switched matrix network, so as to minimize latency of synchronization.

In an embodiment, the first table 182 comprises the following information for a plurality of streams which is processed by the processor:
  an address pointing to a location in the memory 10 where data should be written or read,
  a value size indicating the size of the memory section within the memory available for buffering the stream of data between the communicating processor
  a value space indicating the size of the portion of that section available to the processor coupled to the processor which is coupled to the administration unit,
  a global identification gsid identifying the stream and the processor which is reading or writing this stream.

In an embodiment the second table 183 comprises the following information about the tasks which are performed:
  an identification of one or more streams that are processed for said task,
  a budget available for each task.
  a task enable flag, indicating that the task is enabled or disabled,
  a task runnable flag, indicating whether the task is ready to run or not, Preferably the table 183 comprises for each task only one identification of a stream, for example the first stream of the task. Preferably the identification is an index into the stream table The administraton unit 18 may then simply calculate the corresponding id for other streams, by adding said index and a port number p. The port number can be passed as a parameter of an instruction given by the processor which is coupled to the administration unit.

Figure 9A:
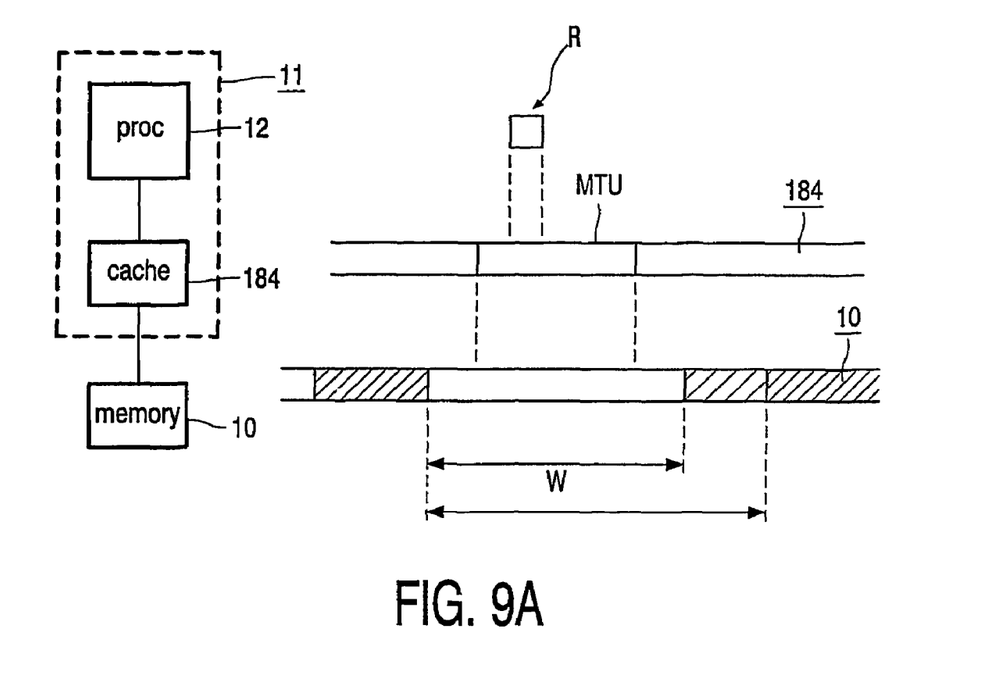
FIG. 9A-9C an illustration of reading and administrating the validity of data in a cache.
Figure 9B:
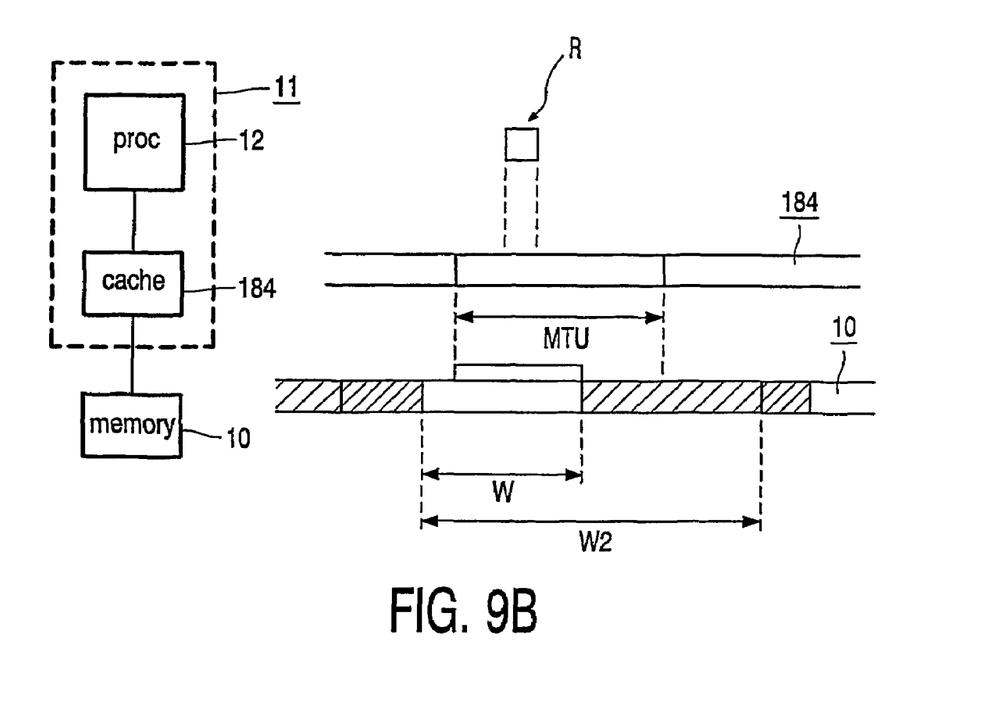
Figure 9C:
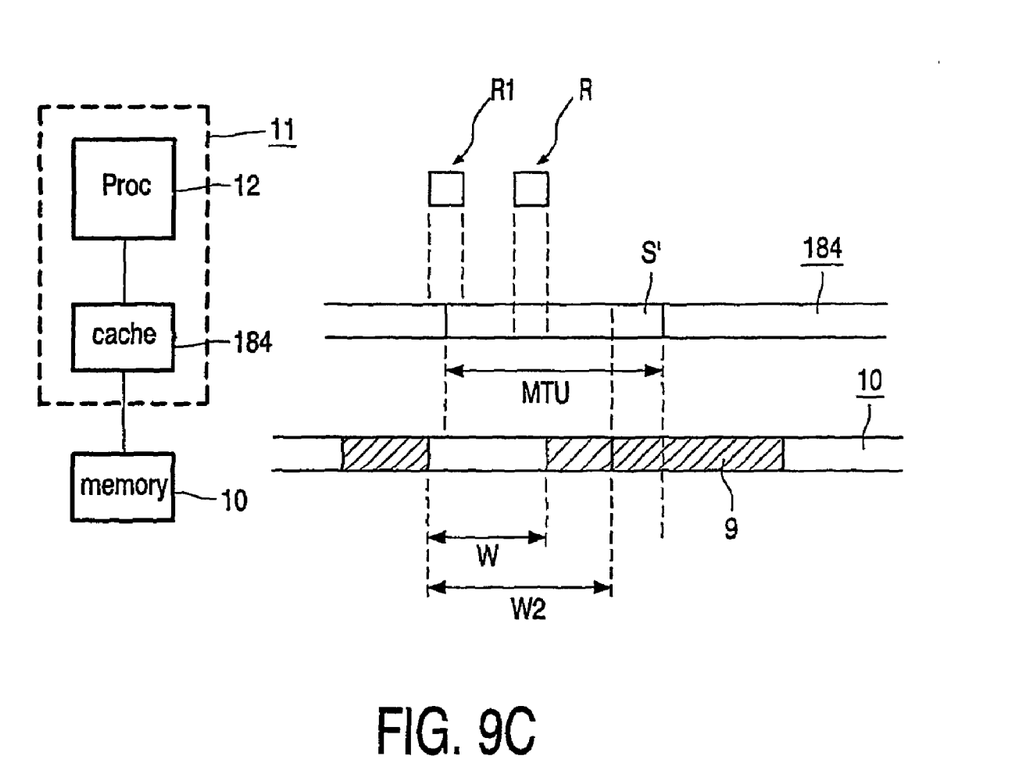

FIG. 9 shows the reading and administrating of the validity of data in a cache in three different situations. In this figure each of the situations assumes that the read request occurs on an empty cache 184 resulting in a cache miss. In the left half of the figures schematically the computation unit 12 and the cache 184 of a processor 11 are shown. The right half shematically shows a portion 184 of the cache which is involved when a read request R takes place. Also the portion of the memory 10 is shown from which the data for the cache is fetched.

FIG. 9A indicates the read request R that leads to fetching a memory transfer unit MTU in the cache 184, i.e. a word, which is entirely contained inside the granted window W. Clearly this whole word MTU is valid in memory and no specific (in-) validation measurements are required.

In the FIG. 9B the read request R has the result that a word MTU is fetched from the memory 10 into the cache 184 which partially extends beyond the space W acquired by the coprocessor but remains inside the space W2 that is locally administrated in the administration unit 18 as available. If only the getspace argument would be used this word MTU would become partially declared invalid and it would need to be re-read once the getspace window W is extended. However, if the actual value of available space W2 is checked the entire word can be marked as valid.

In FIG. 9C the read request R has the effect that the word MTU which is fetched from memory 10 into the cache 184 partially extends into space S which is not known to be saved and might still become written by some other processor. Now it is mandatory to mark the corresponding area S' in the word MTU as invalid when it is loaded into the cache 184. If this part S' of the word gets accessed later the word MTU needs to be re-read.

Furthermore a single read request, see R' in FIG. 9C, could cover more than one memory word either because it crosses the boundary between two successive words. This could also happen if the read interface of the coprocessor 12 is wider than the memory word. FIG. 9A-C shows memory words which are relatively large in comparison with the requested buffer space W. In practice the requested windows W would often be much larger, however in an extreme case the entire cyclic communication buffer could also be as small as a single memory word.

In cache coherency control there are tight relations between the getspace, the read operation and (in-)invalid marks, as well as between putspace, write operations and dirty marks and cache flushes. In a 'Kahn'-style application of ports have dedicated direction, i.e either input or output. Preferably, separated read and write caches are used which simplifies some implementation issues. As for many streams the coprocessors will linearly work through cyclic address space, the read caches optionally support pre-fetching and the write caches optionally support the pre-flushing, within two read access moves to the next word the cache location of the previous word can be made available for expected future use. Separate implementations of the read and write data path also more easily supports read and write requests from the coprocessor occurring in parallel for instance in a pipelined processor implementation.

Also the coprocessors write data at byte granularity and cache administrates dirty bits per bite in the cache. Upon the putspace request of the cache flushes those words from the cache to their shared memory which overlap with the address range indicated by this request. The dirty bits are to be used for the write mask in the bus write requests to assure that the memory is never written at byte positions outside the access window.

The invention claimed is:

1. A data processing system comprising a memory; at least a first and a second processor connected to the memory, both arranged to process a stream of data objects, the first processor being arranged to pass successive data objects from the stream to the second processor by storing the data objects in logically successive locations in the memory, wherein each of the processors comprises an administration unit and a computational unit, the administration unit of the first processor maintaining information defining a section in the memory which is free for storing data objects for readout by the other processor, the administration unit of the second processor maintaining information defining a section in the memory in which the first processor has written completed data for the data objects, a processor synchronization channel, and each of the processors being arranged to signal a message to the other processor via the processor synchronization channel for updating the information in the administration unit of said other processor, and each of the processors being arranged to suspend processing the stream of data objects when a location which it needs to access is outside the section defined by its administration unit.

2. A data processing system according to claim 1, wherein the first processor is arranged to send a message that it makes available an amount of data objects in the memory and that the second processor is arranged to send a message that it no longer needs to access an amount of data objects.

3. A data processing system according to claim 1, wherein the first processor is arranged to send a message that it requires an amount of memory for writing data objects and that the second processor is arranged to send a message that it requires an amount of data objects.

4. A data processing system according to claim 2, wherein the computational unit of the first processor is arranged to issue a command to its functional unit to indicate whether an amount of memory is available in its section for writing new data objects and in that the computational unit of the second processor is arranged to issue a command to its functional unit to indicate whether an amount of data objects is available in the section of said second processor.

5. A data processing system according to claim 1, wherein said second processor is a multi-tasking processor, capable of interleaved processing of at least a first and a second task, wherein said at least first and second task process streams of data objects.

6. A data processing system according to claim 1, wherein the second processor is a function-specific dedicated coprocessor for performing a range of stream processing tasks.

7. A data processing system according to claim 1, wherein the processors are arranged to perform read and/or write operations enabling to randomly access locations within the section in said memory defined by its administration unit.

8. A data processing system according to claim 5, wherein the further processing of a group of data objects of a first task is temporarily prevented, when the processing of said group of data objects is interrupted, wherein processing of data objects of a second task is carried out when processing of said group of data elements of said first task is interrupted.

9. A data processing system according to claim 8, wherein after the interruption of a task the actual task state of the partial processing of the group of data objects is discarded and a commit operation of the partial group of data objects is prevented.

10. A data processing system according to claim 9, wherein after resumption of the interrupted task, the processor restarts the processing of the group of data objects, whereby previous processing on said group is discarded.

11. A data processing system according to claim 1, wherein intermediate data are temporarily stored in said memory.

* * * * *